US012456591B2

(12) United States Patent
Vasilev et al.

(10) Patent No.: US 12,456,591 B2
(45) Date of Patent: Oct. 28, 2025

(54) DRIVING SYSTEM FOR AN ON-LOAD TAP CHANGER

(71) Applicant: HITACHI ENERGY LTD, Zürich (CH)

(72) Inventors: Borislav Vasilev, Sofia (BG); Georgi Manev, Sofia (BG); Veselin Nikolov, Sofia (BG); Angel Mihaylov, Plovdiv (BG)

(73) Assignee: HITACHI ENERGY LTD, Zürich (CH)

( * ) Notice: Subject to any disclaimer, the term of this patent is extended or adjusted under 35 U.S.C. 154(b) by 23 days.

(21) Appl. No.: 18/273,621

(22) PCT Filed: Feb. 15, 2022

(86) PCT No.: PCT/EP2022/053680

§ 371 (c)(1),
(2) Date: Jul. 21, 2023

(87) PCT Pub. No.: WO2023/280443

PCT Pub. Date: Jan. 12, 2023

(65) Prior Publication Data

US 2024/0079190 A1 Mar. 7, 2024

(30) Foreign Application Priority Data

Jul. 6, 2021 (EP) .................................... 21184035

(51) Int. Cl.
*H01H 9/00* (2006.01)

(52) U.S. Cl.
CPC ........ *H01H 9/0027* (2013.01); *H01H 9/0038* (2013.01)

(58) Field of Classification Search
CPC .......... H01H 1/56; H01H 15/08; H01H 19/12; H01H 21/20; H01H 2003/00;
(Continued)

(56) References Cited

U.S. PATENT DOCUMENTS

2016/0181025 A1 6/2016 Hoepfl et al.
2018/0040434 A1 2/2018 Herold et al.

FOREIGN PATENT DOCUMENTS

DE 19602912 A1 7/1997
KR 20070027757 A 3/2007

OTHER PUBLICATIONS

International Search Report and Written Opinion of the International Searching Authority, PCT/EP2022/053680, mailed Jun. 14, 2022, 13 pages.

(Continued)

*Primary Examiner* — Anthony R Jimenez
(74) *Attorney, Agent, or Firm* — Sage Patent Group

(57) ABSTRACT

The present disclosure relates to a driving system for an on-load tap changer, comprising a vacuum interrupter driving mechanism configured to drive a vacuum interrupter of the on-load tap changer, an energy accumulation mechanism mechanically coupled with the vacuum interrupter driving mechanism, and a flywheel mechanism mechanically coupled with the vacuum interrupter driving mechanism. The flywheel mechanism comprises a flywheel. The energy accumulation mechanism is mechanically coupled with a primary driving unit and is configured to accumulate and release energy for combined motion of the vacuum interrupter driving mechanism and the flywheel mechanism. The vacuum interrupter driving mechanism and the flywheel mechanism are arranged along a main driving axis and the flywheel is concentrically arranged around the main driving axis.

20 Claims, 6 Drawing Sheets

(58) Field of Classification Search
CPC ....... H01H 2009/00; H01H 2009/0005; H01H 2009/0016; H01H 2009/0061; H01H 9/0016; H01H 9/0027; H01H 9/00; H01H 9/0005; H01H 9/0011; H01H 9/0066; H01H 9/0038; H02F 29/025; H02F 29/04
USPC ............................................................ 200/11
See application file for complete search history.

(56) References Cited

OTHER PUBLICATIONS

International Preliminary Report on Patentability, PCT/EP2022/053680, mailed May 31, 2023, 17 pages.
Decision for Grant of Patent mailed Jun. 18, 2025 for Korean Patent Application No. 10-2023-7030076, 6 pages (incudes English translation).

DRIVING SYSTEM FOR AN ON-LOAD TAP CHANGER

CROSS REFERENCE TO RELATED APPLICATIONS

This application is a 35 U.S.C. § 371 national stage application of PCT International Application No. PCT/EP2022/053680 filed on Feb. 15, 2022, which in turn claims priority to European Patent Application No. 211840035.0, filed on Jul. 6, 2021, the disclosures and content of which are incorporated by reference herein in their entireties.

TECHNICAL FIELD

The present disclosure relates to a driving system for an on-load tap changer (OLTC). The present disclosure further relates to an OLTC with such a driving system. Commonly most classical solutions in OLTC design comprise two general classes of mechanisms—a driving mechanism supplying the operational movement of the unit and a driven mechanism performing electrical commutations needed for the transition from one tap position to another.

BACKGROUND

One of the main challenges for ensuring the normal operation of the OLTC is the accumulation and synchronous release of enough energy to perform all operations of the driven mechanism, while in the same time not to release too much energy leading to the damage of the driven mechanism's components.

The driving mechanism of an OLTC commonly comprises an energy accumulation mechanism and a flywheel. For the driving mechanism in the majority of cases the possible amount of energy directly correlates with two main parameters—the amount of energy released from the energy accumulation mechanism and the generated inertia from the flywheel.

US 2016/181025 A1 describes an on-load tap changer comprising a diverter switch insert and a vacuum interrupter, which is rotatable about an axis and to which at least one switching module is assigned. The switching module comprises at least one switching segment fastened on the vacuum interrupter and an associated resistor arrangement. An actuating arrangement is assigned to the switching module on an inner wall of an oil tank.

DE 196 02 912 A1 describes a drive for a movable contact of an electric switch. The drive includes a double-arm lever. One arm is coupled to the movable contact. The other arm is coupled to a drive mechanism. The drive mechanism has a spring drive with only one spring and also a cam disk. The spring drive sets the cam disk into rotation in two directions. The device may also have a rotatably mounted flywheel with two handles. These are alternately coupled to the circumference of the wheel by a pin.

US 2018/040434 A1 describes an energy accumulator for or in an on-load tap changer comprising a motor with an output shaft as well as a load transfer switch with an input shaft. Further comprising a gear unit which is coupled to an accumulation element and which comprises an input hub that can be connected to the output shaft for conjoint rotation therewith and an output hub that can be connected to the input shaft for conjoint rotation therewith. A variable transmission means is connected between the input hub and the accumulation element.

SUMMARY

Where both the energy accumulation mechanism and flywheel may differ in shape and size, restrictions are presented in most cases for the flywheel. Using a large flywheel presents several disadvantages, from the needed construction space to severe impact to the dielectric field distribution. Hence, embodiments of the disclosure relate to an improved driving system for an OLTC and an OLTC with such a driving system that overcome the above mentioned disadvantages.

According to an embodiment, a driving system for an OLTC comprises a vacuum interrupter driving mechanism, an energy accumulation mechanism and a flywheel mechanism. The vacuum interrupter driving mechanism is configured to drive a vacuum interrupter of the OLTC. The energy accumulation mechanism is mechanically coupled with the vacuum interrupter driving mechanism. The flywheel mechanism is mechanically coupled with the vacuum interrupter driving mechanism. The flywheel mechanism comprises a flywheel. The energy accumulation mechanism is mechanically coupled with a primary driving unit. The energy accumulation mechanism is configured to accumulate and release energy for combined motion of the vacuum interrupter driving mechanism and the flywheel mechanism. The vacuum interrupter driving mechanism and the flywheel mechanism are arranged along a main driving axis and the flywheel is concentrically arranged around the main driving axis.

The driving system provides a good performance regarding the accumulation and synchronous release of energy to perform the required driving, while at the same time not to release too much energy leading to a damage of the driven components.

The driving system further allows for an improved inertial mass distribution on the flywheel leading to good driving performance for a stable and reliable operation of driven components of an OLTC, like the vacuum interrupter driving mechanism or further components. Moreover, since the flywheel is concentrically arranged around the main driving axis, the driving system can be constructed with compact size keeping the constructional space small. The concentrically arranged flywheel also leads to an optimization of the dielectric field distribution.

For example, a vacuum interrupter of an OLTC in which the driving system can be used comprises electric contact elements for electrically opening or closing contacts in vacuum to bypass electric switching currents and to protect other switching elements of the OLTC. Switching of the electric contact elements of the vacuum interrupter, hence, can for example be performed by rotary motion introduced into the vacuum interrupter via the vacuum interrupter driving mechanism.

According to a further embodiment of the driving system, the flywheel is configured as annular flywheel, in particular as annular rounded flywheel. This provides for an evenly distributed inertial mass leading to a further improved driving performance. Moreover, the annular construction of the flywheel provides for additional installation space gained inside the outer annular extension of the flywheel. This leads to a further saving of space, since other components can be accommodated inside the outer annular extension of the flywheel, with the annular flywheel surrounding these components. Moreover, the configuration of the flywheel as annular flywheel, in particular annular rounded (no sharp edges) flywheel, further contributes to the optimization of the dielectric field distribution within an OLTC in which the driving system is installed. In an exemplary embodiment, the flywheel is configured as annular fully rounded flywheel.

According to a further embodiment of the driving system, the primary driving unit is mechanically coupled with a connection to a motor drive unit (MDU). In this way, the primary driving unit can easily be coupled with an MDU of the OLTC. For example, the MDU is a motor or other actor for providing driving energy to the driving system. For example, the primary driving unit is a gear wheel rotationally coupled with a gear of the MDU connection. The MDU connection is for example coupled with a driving shaft of the MDU.

According to a further embodiment of the driving system, the energy accumulation mechanism comprises a spring mechanism configured to accumulate spring energy and a loading mechanism mechanically coupled with the primary driving unit and with the spring mechanism. The loading mechanism is configured to load the spring mechanism for accumulating spring energy in the spring mechanism such that the accumulated spring energy is releasable from the loaded spring mechanism to drive the vacuum interrupter driving mechanism. The spring mechanism provides for a reliable accumulation and release of a defined amount of energy. The loading mechanism serves the purpose of loading the spring mechanism on demand, i.e., when accumulated energy is needed for a driving operation. This avoids the spring mechanism from unnecessarily accumulating energy and being overstressed or overused, which extends the functional life of the mechanism. The combination of the spring mechanism together with the loading mechanism has the advantage that energy can be introduced into the driving system in a controlled manner.

According to a further embodiment of the driving system, the vacuum interrupter driving mechanism comprises a rotary wheel arranged around the main driving axis and eccentrically coupled with a coupling element of the energy accumulation mechanism. The coupling element of the energy accumulation mechanism is configured to transmit rotary motion caused by a release of energy from the energy accumulation mechanism into rotary motion of the rotary wheel of the vacuum interrupter driving mechanism. The eccentric coupling between the coupling element of the energy accumulation mechanism and the rotary wheel of the vacuum interrupter driving mechanism has the effect that energy can be properly transmitted from the energy accumulation mechanism to the vacuum interrupter driving mechanism without mechanically stressing a rotary axis of the coupling element with high torque peaks. Moreover, the rotary wheel of the vacuum interrupter driving mechanism serves the purpose of a swing mass to overcome the moment of inertia of the flywheel and to set the flywheel into rotary motion.

According to a further embodiment, the driving system further comprises a selector system driving mechanism configured to drive a selector system of the OLTC. The selector system driving mechanism is mechanically coupleable with a drive shaft of the selector system for driving the selector system. Such mechanical coupling is, for example, provided through a gearing with one or more gear wheels. The selector system driving mechanism is further mechanically coupleable with the primary driving unit. In this way, the primary driving unit serves the purpose of additionally driving the selector system driving mechanism as an additional driving segment besides the vacuum interrupter driving mechanism. For example, a selector system of an OLTC in which the driving system can be used comprises electric contact elements for electrically contacting taps of the OLTC. Switching of the electric contact elements between respective taps of the OLTC, hence, can for example be performed by rotary motion introduced into the selector system via the selector system driving mechanism.

According to a further embodiment of the driving system, the selector system driving mechanism comprises a coupling configured to transmit rotary movement from the primary driving unit to the selector system driving mechanism in determined rotary states of the primary driving unit and to cause an idle movement of the primary driving unit with respect to the selector system driving mechanism in other rotary states of the primary driving unit. In this way, the selector system driving mechanism is selectively coupleable with the primary driving unit. In determined rotary states or rotary movement positions of the primary driving unit the selector system driving mechanism is driven by the primary driving unit. In other rotary states or rotary movement positions of the primary driving unit the selector system driving mechanism is decoupled from the primary driving unit, such that no rotary motion is transmitted from the primary driving unit to the selector system driving mechanism. This is, for example, useful in determined states of the driving system in which only the energy accumulation mechanism is to be driven by the primary driving unit, whereas the selector system driving mechanism or other components are not to be driven by the primary driving unit.

According to a further embodiment, the driving system further comprises a changeover selector driving mechanism configured to drive a changeover selector of the OLTC. The changeover selector driving mechanism is mechanically coupleable with a drive shaft of the changeover selector for driving the changeover selector. The changeover selector driving mechanism is, at least indirectly, mechanically coupled with the primary driving unit. In this way, the primary driving unit serves the purpose of additionally driving the changeover selector driving mechanism as an additional driving segment besides the vacuum interrupter driving mechanism. For example, a changeover selector, e.g. a changeover switch, of an OLTC in which the driving system can be used comprises one or more electric contact elements for electrically contacting a voltage line of a high voltage side of an energy supply network with respective taps of the OLTC. Switching of the electric contact elements of the changeover selector, hence, can for example be performed by rotary and/or linear motion introduced into the changeover selector via the changeover selector driving mechanism.

According to a further embodiment of the driving system, the selector system driving mechanism comprises a driving wheel. The driving wheel is mechanically coupleable with the primary driving unit and with a rotary element, such that the rotary element is rotatable by the primary driving unit via the driving wheel. The changeover selector driving mechanism is mechanically coupled with the rotary element, such that the rotary element is rotatable by the driving wheel of the selector system driving mechanism and the changeover selector driving mechanism is operable by the rotary element.

The driving wheel can control a movement of the rotary element according to a predetermined transmission ratio and/or a predetermined movement sequence. For example, the rotary element comprises a so-called Geneva ring at its outer circumference for mechanical interaction with the driving wheel. In this way, the driving wheel and the Geneva ring together form a Geneva mechanism.

Further, the changeover selector driving mechanism is mechanically coupled with the rotary element through a coupling element of the changeover selector driving mechanism. Hence, with the aid of the driving wheel, the rotary element, and the coupling element of the changeover selector driving mechanism, a movement of the changeover selector driving mechanism according to a predetermined transmission ratio and/or a predetermined movement sequence can be controlled. This serves the purpose of a controlled switching of a changeover selector of the OLTC.

For example, a coupling between the rotary element and the coupling element of the changeover selector driving mechanism is realized through an additional Geneva mechanism, formed by a further Geneva drive of the rotary element and the coupling element of the changeover selector driving mechanism. For example, the Geneva drive on the rotary element interacts with a Geneva sector of the coupling element on the changeover selector driving mechanism. By rotary motion of the Geneva drive on the rotary element, a controlled rotary motion of the coupling element on the changeover selector driving mechanism can be forced, the latter resulting e.g. in a switching action to be performed within a changeover selector of an OLTC in which the driving system is used.

According to an exemplary embodiment, the additional Geneva mechanism is configured to transmit rotational movement onto a shaft of the changeover selector driving mechanism. For example, a bevel gear wheel is attached to the shaft of the changeover selector driving mechanism, the bevel gear wheel being configured to rotate a second bevel gear wheel. A lever is, for example, coupled to the second bevel gear wheel for transmission of rotation into linear movement for operating the changeover selector.

According to a further embodiment, an OLTC is implemented that comprises a driving system as described above. The OLTC achieves the same effects as explained above in the context of the driving system.

According to a further embodiment, the OLTC comprises a cylindrically formed housing and a carrying flange arranged on the cylindrically formed housing, e.g. in an upper area or on top of the cylindrically formed housing. The driving system is attached to the carrying flange and concentrically placed relative to the cylindrically formed housing. In this way, the overall height of the driving mechanism can be kept small and does not surpass the height of the carrying flange. This affects the dielectric field distribution in a beneficial way.

According to a method of operating a driving system for an OLTC, the following steps are performed:

- mechanically coupling an energy accumulation mechanism of the driving system with a primary driving unit of the driving system to accumulate energy,
- mechanically coupling the energy accumulation mechanism with a vacuum interrupter driving mechanism of the driving system,
- mechanically coupling the vacuum interrupter driving mechanism with a flywheel mechanism, wherein the flywheel mechanism comprises a flywheel and wherein the vacuum interrupter driving mechanism and the flywheel mechanism are arranged along a main driving axis and the flywheel is concentrically arranged around the main driving axis,
- accumulating energy in the energy accumulation mechanism by loading the energy accumulation mechanism through operation of the primary driving unit,
- releasing the accumulated energy from the energy accumulation mechanism for combined motion of the vacuum interrupter driving mechanism and the flywheel mechanism to drive a vacuum interrupter of the OLTC.

The method achieves the same effects as explained above in the context of the driving system and the OLTC respectively. For example, the method is specifically applied to a driving system or to an on-load tap changer according to above explanations.

Features and advantages described in connection with the driving system or the OLTC can therefore be applied or used for the method and vice versa.

The present disclosure comprises several aspects of a driving system, an OLTC and an operation method for a driving system for an OLTC. Every feature described with respect to one of the aspects is also disclosed herein with respect to the other aspect, even if the respective feature is not explicitly mentioned in the context of the specific aspect.

BRIEF DESCRIPTION OF THE DRAWINGS

The accompanying figures are included to provide a further understanding. In the figures, elements of the same structure and/or functionality may be referenced by the same reference signs. It is to be understood that the embodiments shown in the figures are illustrative representations and are not necessarily drawn to scale.

DETAILED DESCRIPTION

Figure 1:
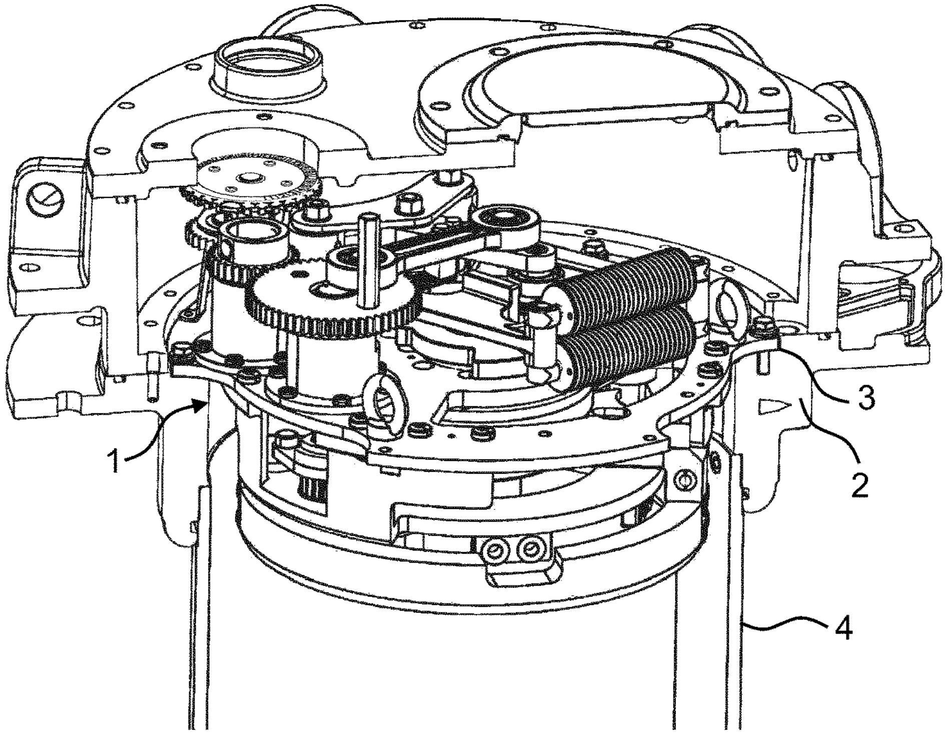
FIG. 1 is a perspective view of the interior of an OLTC housing with cut open housing parts and an accommodated driving system according to an embodiment.

FIG. 1 is a perspective view of the interior of an OLTC housing 4 with cut open housing parts and an accommodated driving system 1 according to an embodiment. FIG. 1 shows the cut open housing part of a cylindrically formed housing 4 on which a carrying flange 2 is arranged. A driving system 1 for the OLTC is attached to the carrying flange 2 and concentrically placed relative to the cylindrically formed housing 4. The driving system 1 is secured to the carrying flange 2 of the cylindrically formed housing 4 by means of a screw connection 3.

According to the embodiment illustrated in FIG. 1, the driving system 1 is arranged in an upper area or on top of the cylindrically formed housing 4. In a lower area (not illustrated in FIG. 1) of the cylindrically formed housing 4 the OLTC can provide components to be driven by the driving system 1. Such components may comprise one or more of a vacuum interrupter, a selector system and a changeover selector providing defined switching mechanics of the OLTC.

For example, the vacuum interrupter provides for a controlled opening and closing of electrical contacts in vacuum to bypass electric switching currents during a tap changing operation of the OLTC. Switching of the vacuum interrupter can, for example, be performed by rotary motion introduced into the vacuum interrupter by means of the driving system 1.

For example, the selector system of the OLTC comprises electric contact elements for electrically contacting and switching between taps of the OLTC to change between different transformer ratios of a transformer controlled by the OLTC. Switching of the electric contact elements of the selector system between respective taps of the OLTC can, for example, be performed by rotary motion introduced into the selector system by means of the driving system 1.

For example, the changeover selector of the OLTC comprises one or more electric contact elements for electrically contacting a voltage line of a high voltage side of an energy supply network with respective taps of the OLTC, connected by means of the selector system. Switching of the electric contact elements of the changeover selector can, for example, be performed by rotary and/or linear motion introduced into the changeover selector by means of the driving system 1.

Figure 2:
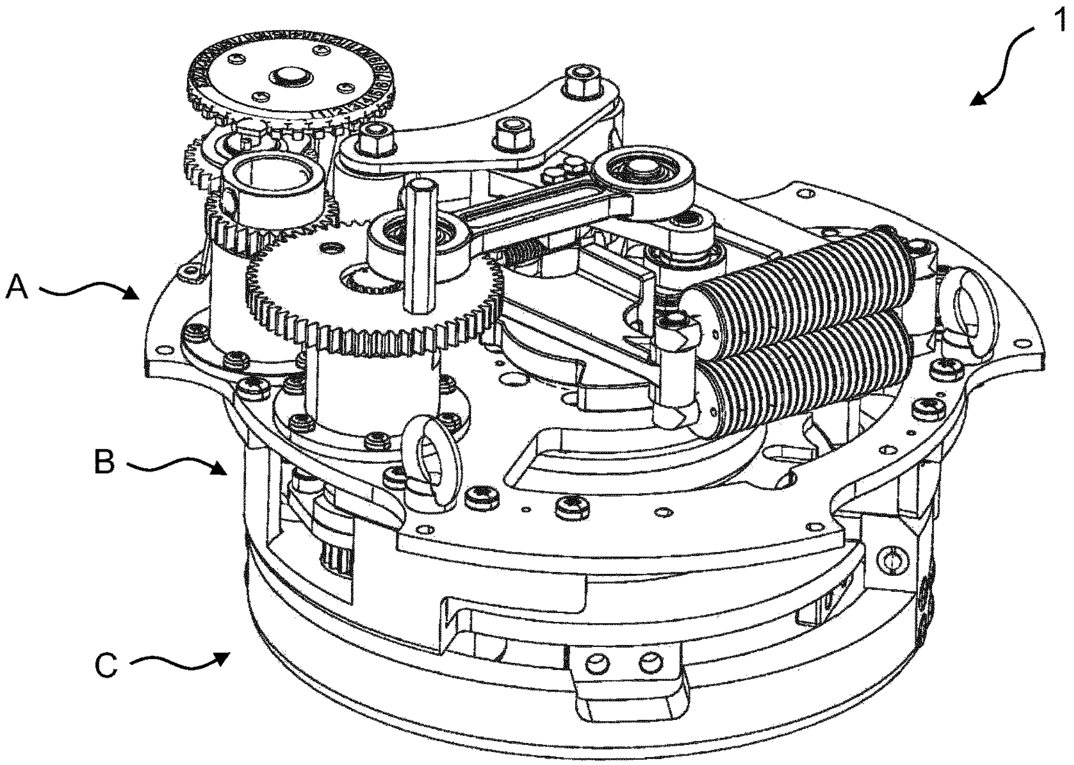
FIG. 2 is a perspective view of the driving system according to FIG. 1.

FIG. 2 is a perspective view of the driving system 1 according to FIG. 1. As can be seen from FIG. 2, the driving system 1 is constructed with different sections A, B, C arranged along a main axis and interacting together to form the driving system 1. Each of the different sections A, B, C provides for a specific mechanical functionality of the driving system 1 as is further explained below.

Due to the stacked arrangement of the different sections A, B, C the driving system 1 can be constructed with a compact size, keeping the constructional space small. This also leads to an optimization of the dielectric field distribution within the OLTC housing 4 (see FIG. 1). Nevertheless, the driving system 1 provides a good performance regarding an accumulation and synchronous release of energy to perform a required driving of respective OLTC switching components, while at the same time not releasing too much energy leading to a damage of the driving components or driven components.

Figure 3:
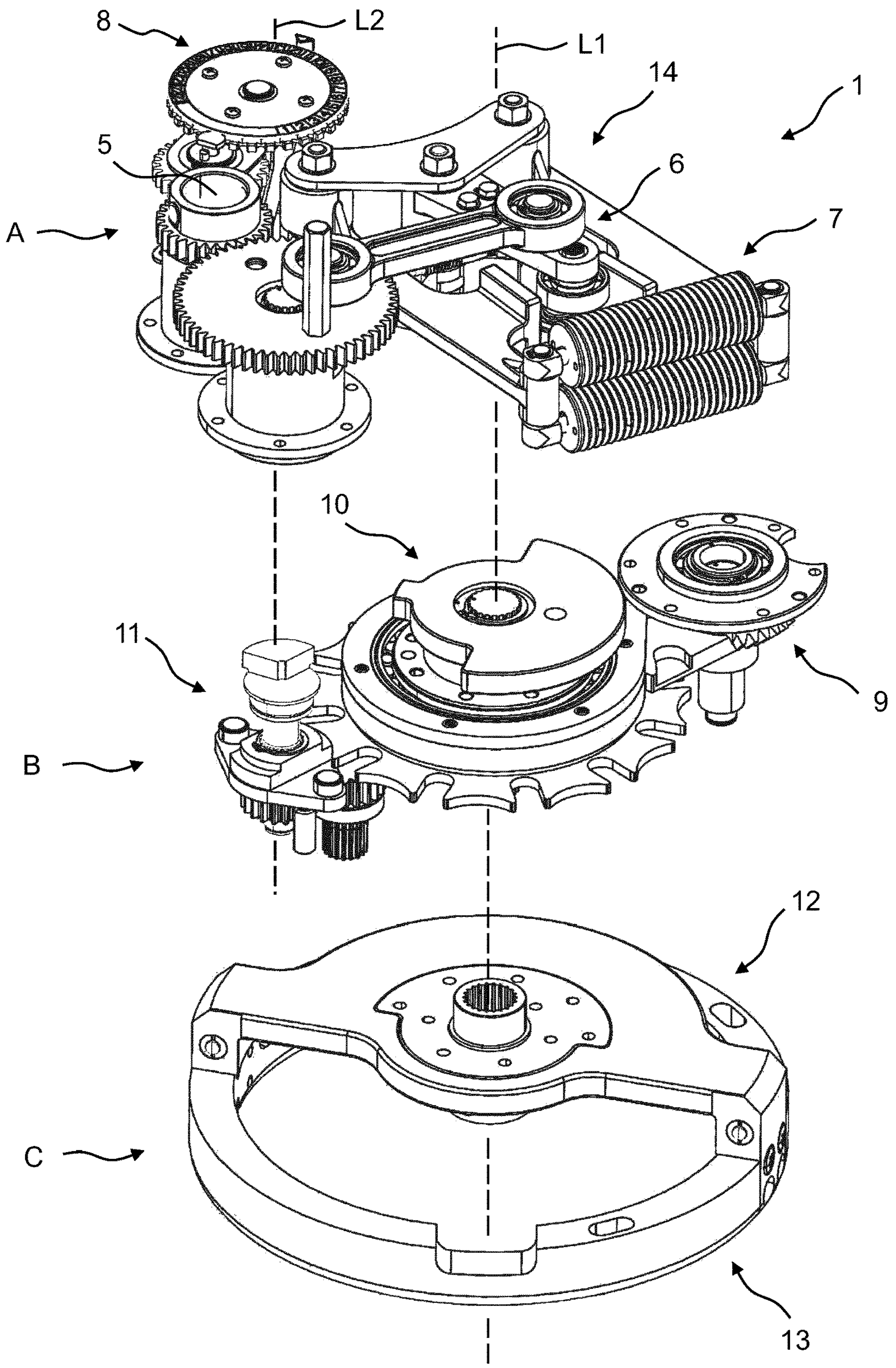
FIG. 3 is an exploded view of different sections of the driving system according to FIG. 2.

FIG. 3 is an exploded view of the different sections A, B, C of the driving system 1 according to FIG. 2. FIG. 3 illustrates the different sections A, B, C arranged along a main driving axis L1 for mechanical interaction between the three sections A, B, C, beginning with section A in the upper part, followed by section B in the middle part and followed by section C in the lower part. Moreover, driving components of sections A and B are arranged along a secondary driving axis L2 for mechanical interaction between the sections A and B.

Section A of the driving system 1 is a so-called energy accumulation section and provides an energy accumulation mechanism 14. The energy accumulation mechanism 14 comprises a loading mechanism 6 and a spring mechanism 7. The loading mechanism 6 is mechanically coupled with a MDU connection 5. The spring mechanism 7 is mechanically coupled with the loading mechanism 6. Due to a driving motion introduced by the MDU connection 5, the loading mechanism 6 can load the spring mechanism 7 for accumulating spring energy in the spring mechanism 7. The accumulated spring energy is releasable from the loaded spring mechanism 7 to drive the vacuum interrupter driving mechanism 10 of section B of the driving system 1. Section B is called a first driving section.

The energy accumulation section A also comprises a position indicator 8 configured to indicate a respective tap position of a selector system of the OLTC. The position indicator 8 is mechanically coupled with the MDU connection 5 and can be driven through MDU connection 5. The MDU connection 5 is configured to be coupled with an MDU of the OLTC.

The first driving section B comprises, besides the already mentioned vacuum interrupter driving mechanism 10, also a changeover selector driving mechanism 9 configured to drive a changeover selector of the OLTC. In addition, the first driving section B also comprises a selector system driving mechanism 11 configured to drive a selector system of the OLTC.

The selector system driving mechanism 11 is configured to be mechanically coupled along the secondary driving axis L2 with a primary driving unit of the energy accumulation section A, as is explained in detail below. Moreover, the selector system driving mechanism 11 is further mechanically coupled with the changeover selector driving mechanism 9 such that the changeover selector driving mechanism 9 can be actuated by the selector system driving mechanism 11, as is explained in further detail below.

The third section C according to FIG. 3 is a so-called second driving section and comprises a flywheel mechanism 12 with an annular flywheel 13 arranged thereon. The flywheel mechanism 12 is mechanically coupled with the vacuum interrupter driving mechanism 10 of the first driving section B. In this way, the vacuum interrupter driving mechanism 10 and the flywheel mechanism 12 are configured to perform a combined rotary motion triggered by a release of energy by the spring mechanism 7 of the energy accumulation mechanism 14, as is further explained in detail below.

The construction of the flywheel mechanism 12 of the second driving section C allows for an improved inertial mass distribution on the flywheel 13 leading to a good driving performance for a stable and reliable operation of driven components of the OLTC, like the vacuum interrupter driving mechanism 10. Moreover, since the flywheel 13 is constructed as an annular flywheel and concentrically arranged around the main driving axis L1, a space-saving construction of the driving system 1 can be further enhanced. The annular construction of the flywheel 13 also enables components like the selector system driving mechanism 11 or the changeover selector driving mechanism 9 to be, at least partially, accommodated inside the outer annular extension of the flywheel 13 with the annular flywheel 13 surrounding these components. This also leads to a further saving of constructional space. Moreover, since the flywheel 13 is constructed as an annular flywheel and concentrically arranged around the main driving axis L1, the flywheel 13 serves for an optimized dielectric field distribution within the OLTC.

In the following and with regard to FIGS. 4 to 6, the respective sections A, B and C of the driving system 1 (see FIG. 3) and their mechanical interaction are explained in greater detail.

Figure 4:
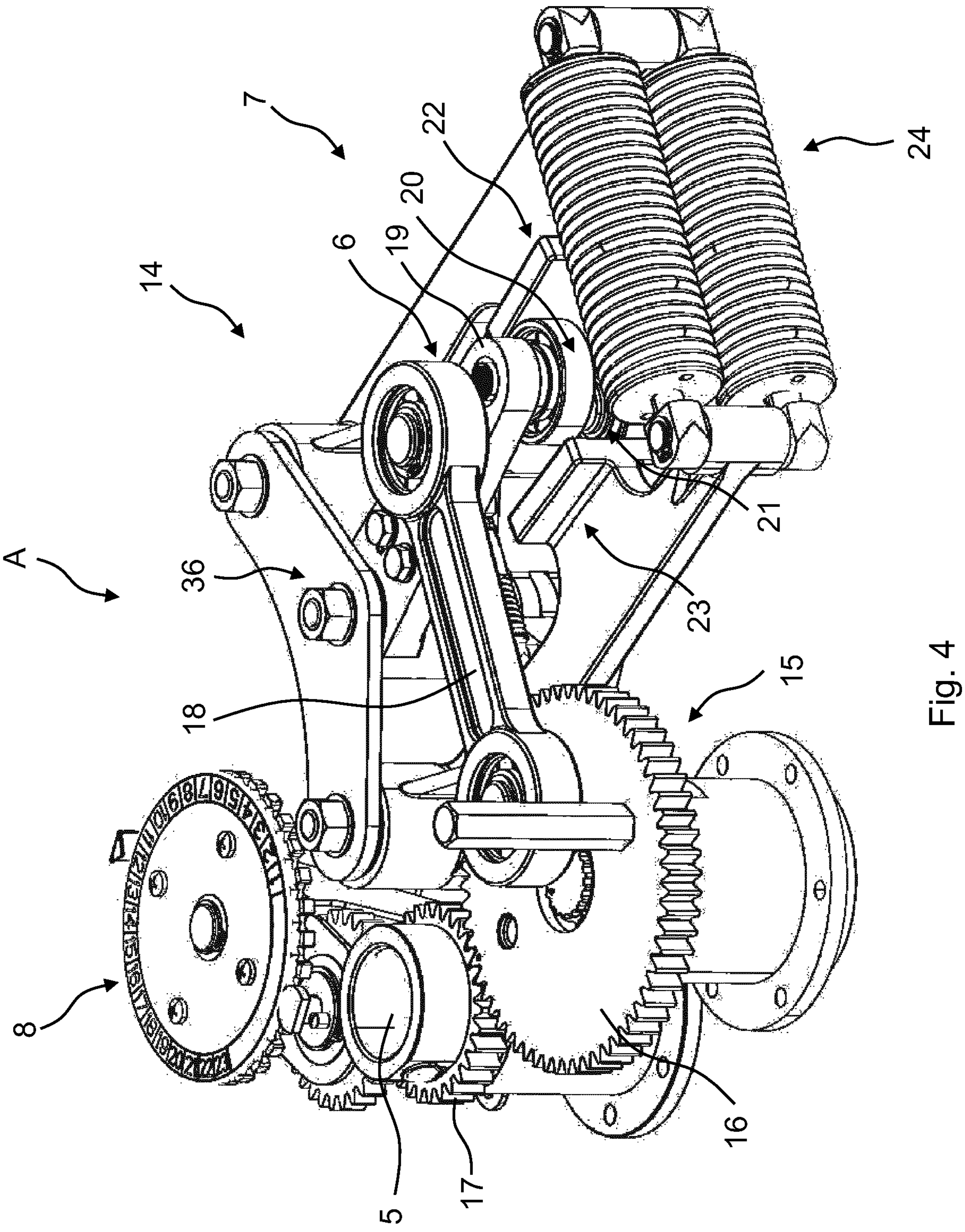
FIG. 4 is a perspective view of an energy accumulation section of the driving system according to FIGS. 2 and 3.

FIG. 4 shows a perspective view of the energy accumulation section A of the driving system 1 according to FIGS. 2 and 3. The MDU connection 5 provides a gear 17 by which the MDU connection 5 is mechanically coupled with the position indictor 8 to drive the position indicator 8 for indicating a respective tap position of the OLTC. Additionally, the gear 17 of the MDU connection 5 is also mechanically coupled with a gear wheel 16 of the primary driving unit 15.

A loading rod 18 is eccentrically arranged on the gear wheel 16 of the primary driving unit 15 and connects the primary driving unit 15 through the gear wheel 16 with a loading lever 19 of the loading mechanism 6 of the energy accumulation mechanism 14. The loading lever 19 provides an upper rolling-contact bearing 20 on one end. With the other end, the loading lever 19 is pivoted in a holding area 36 of the energy accumulation mechanism 14. Under the loading lever 19 with its upper rolling-contact bearing 20 a further rotary lever, so-called switching lever (not illustrated in FIG. 4) is arranged providing a lower rolling-contact bearing 21.

The spring mechanism provides a right lever 22 and a left lever 23 between which two springs 24 are arranged. Each of the springs 24 connects the right and left levers 22 and 23. The right and left levers 22 and 23 can be actuated by the loading lever 19 through the upper rolling-contact bearing 20 which can be brought into contact with either of the right and left lever 22 and 23 at respective contact areas.

The action of the energy accumulation mechanism 14 is as follows. In an assumed starting position, the switching lever (not illustrated in FIG. 4) is rotated and a stem of the switching lever is locked by a right locking pawl (not illustrated in FIG. 4) of the holding area 36. The levers 22 and 23 are turned to the left. The loading lever 19 is also turned to the left. When the primary driving unit 15 is driven through the MDU connection 5 (actuated by an MDU, not shown in FIG. 4), the gear 17 urges the gear wheel 16 into rotary movement such that the loading rod 18 acts on the loading lever 19 of loading mechanism 6. The loading rod 18 moves the loading lever 19 to the right and its bearing 20 acts on the right lever 22 and moves it to the right. At the same time, the bearing 21 holds the left lever 23 in the starting position and the springs 24 begin to tighten. At a certain angle before the gear wheel 16 reaches its right dead point (as illustrated in FIG. 4), a corresponding pawl (not illustrated) from the loading lever 19 releases the above-mentioned locking pawl of holding area 36 and the left lever 23, by the action of the tightened springs 24, jogs to the right and, via bearing 21 acts on the switching lever to urge the switching lever into rotary movement. The stem of the switching lever is then locked again by a left locking pawl (not illustrated in FIG. 4) of the holding area 36. The energy accumulation mechanism 14 is then ready for the next switching. This happens in a similar manner by turning the gear wheel 16 further into a continuous rotary motion driven by the MDU connection 5 through gear 17. By the next switching which happens in a "mirrored" manner to the first switching operation the switching lever is urged again into rotary movement. The stem of the switching lever is then locked again by the right locking pawl (not illustrated in FIG. 4) of the holding area 36.

Figure 5:
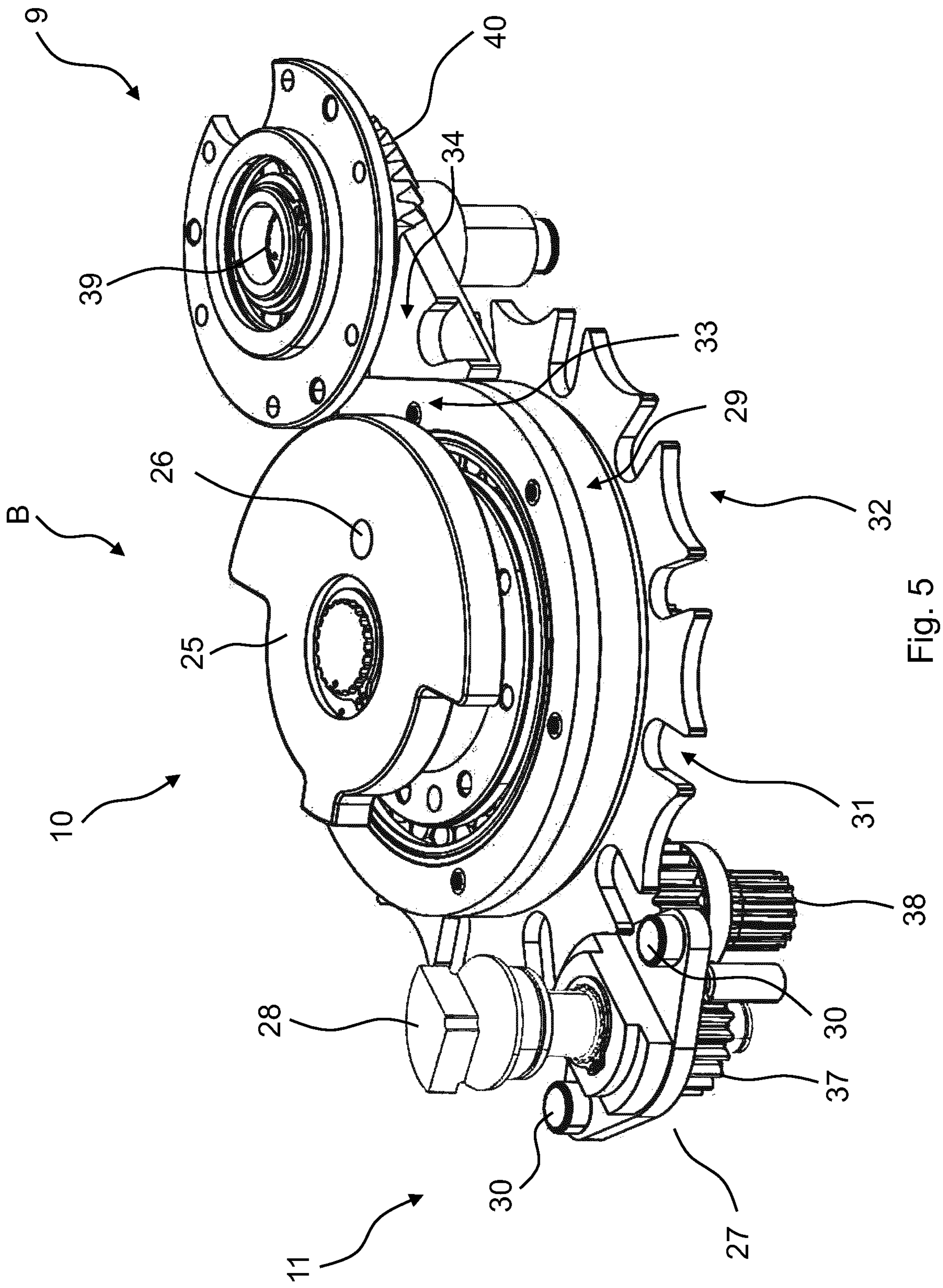
FIG. 5 is a perspective view of a first driving section of the driving system according to FIGS. 2 and 3.

FIG. 5 is a perspective view of the first driving section B of the driving system 1 according to FIGS. 2 and 3. FIG. 5 shows in detail (parts of) the changeover selector driving mechanism 9, the vacuum interrupter driving mechanism 10 as well as the selector system driving mechanism 11.

The vacuum interrupter driving mechanism 10 is mechanically coupled with the switching lever (see above explanations) of the energy accumulation mechanism 14 of FIG. 4. This is done through a coupling 26 on a rotary wheel 25 of the vacuum interrupter driving mechanism 10 with the bearing 21 (see above explanations). A release of accumulated energy by the spring mechanism 7 of the energy accumulation mechanism 14, as explained above, urges the switching lever of the energy accumulation mechanism 14 into an abrupt rotary movement when the respective lever 22 or 23, by the action of the tightened springs 24, jogs to one side. Due to the coupling 26 (with bearing 21) on the rotary wheel 25, as illustrated in FIG. 5, the abrupt rotary movement of the switching lever of the spring mechanism 7 urges the rotary wheel 25 of the vacuum interrupter driving mechanism 10 into rotary movement, too. In detail, the rotary wheel 25 jogs in a coordinated movement between two discrete end positions as the switching lever of the spring mechanism 7 jogs between two discrete end positions (as explained above). One end position of the rotary wheel 25 is illustrated in FIG. 5.

Since the flywheel mechanism 12 (see FIG. 3 and above explanations) is mechanically coupled with the vacuum interrupter driving mechanism 10, the rotary movement of the rotary wheel 25 of vacuum interrupter driving mechanism 10 urges the flywheel mechanism 12 into combined motion together with the rotary wheel 25. This leads to a defined switching movement supported by mass inertia effects of the flywheel 13. In this way, the vacuum interrupter driving mechanism 10, actuated by the spring mechanism 7, is configured to actuate a coordinated switching of a vacuum interrupter of the OLTC.

As further illustrated in FIG. 5, the selector system driving mechanism 11 comprises a driving wheel 27. The driving wheel 27 is mechanically coupleable with the primary driving unit 15 along the secondary driving axis L2 (see FIGS. 3 and 4 and above explanations). This means that a rotary motion of the primary driving unit 15, caused by mechanical coupling with MDU connection 5, can be transmitted through coupling 28 on the driving wheel 27 and, therefore, urges the driving wheel 27 into a rotary movement.

The coupling 28 is configured as a circle segment to transmit rotary movement from the primary driving unit 15 to the selector system driving mechanism 11 in determined rotary states or rotary movement positions of the primary driving unit 15 and to cause an idle movement of the primary driving unit 15 with respect to the selector system driving mechanism 11 in other rotary states of the primary driving unit 15. For example, the circle segment of coupling 28 is configured to interact with a counter-segment of the primary driving unit 15 only in certain determined position to each other. This means that in determined rotary states or rotary movement positions, the circle segment of coupling 28 and the counter-segment of the primary driving unit 15 are either in force-coupling or out of force-coupling. In force-coupling, the selector system driving mechanism 11 is driven by the primary driving unit 15. Out of force-coupling, the selector system driving mechanism 11 is not driven by the primary driving unit 15, the latter being in an idle movement mode.

The driving wheel 27 of the selector system driving mechanism 11 provides a gear wheel 37 coupled with another gear wheel 38 to form a gearing. The gear wheel 38 is arranged in line with a drive shaft (not shown) of the selector system for driving the selector system. Hence, by rotational movement of the selector system driving mechanism 11 through coupling with the primary driving unit 15 at coupling 28, the gearing 37/38 is actuated to drive the selector system (not shown).

The drive shaft of the selector system is, for example, coupled through other mechanics (e.g., Geneva mechanism) with tap selector elements of a selector system of the OLTC, such that a rotary movement of the drive shaft of the selector system leads to a switching movement within the selector system of the OLTC. For example, with beginning rotary movement of the drive shaft of the selector system a closed electrical contact between contact elements of the selector system with respective taps of the OLTC can be opened and with continuous rotary movement the electric contact elements travel to another tap position of the OLTC and close respective electrical contacts with the other tap by reaching a defined position through further rotary movement of the drive shaft of the selector system.

Further regarding the selector system driving mechanism 11, protrusions 30 on the driving wheel 27 are configured to interact with indentations 31 of a Geneva ring 32 of a rotary element 29. Hence, a rotary motion of the driving wheel 27 can be selectively transmitted into a rotary motion of the Geneva ring 32. In this way, the driving wheel 27 causes a movement of the Geneva ring 32 of the rotary element 29 according to a predetermined transmission ratio and/or a predetermined movement sequence.

The rotary element 29 further provides another Geneva drive 33 on its outer circumference, as illustrated in FIG. 5. The Geneva drive 33 is configured to interact with a coupling element 34 of the changeover selector driving mechanism 9. Through rotary movement of the rotary element 29, the Geneva drive 33 urges the coupling element 34 into rotary movement. This transmits rotational movement onto a shaft 39 of the changeover selector driving mechanism 9. A bevel gear wheel 40 is attached to the shaft 39 of the changeover selector driving mechanism 9. The bevel gear wheel 40 is configured to rotate a second bevel gear wheel (not shown in FIG. 5) for operating the changeover selector.

The first driving section B according to FIG. 5, therefore, enables a combined mechanical actuation of the driving segments 9, 10 and 11 through mechanical interaction with the primary driving unit 15 along the secondary driving axis L2 as well as with the energy accumulation mechanism 14 along the main driving axis L1 according to FIGS. 3 and 4 and as explained above.

Figure 6:
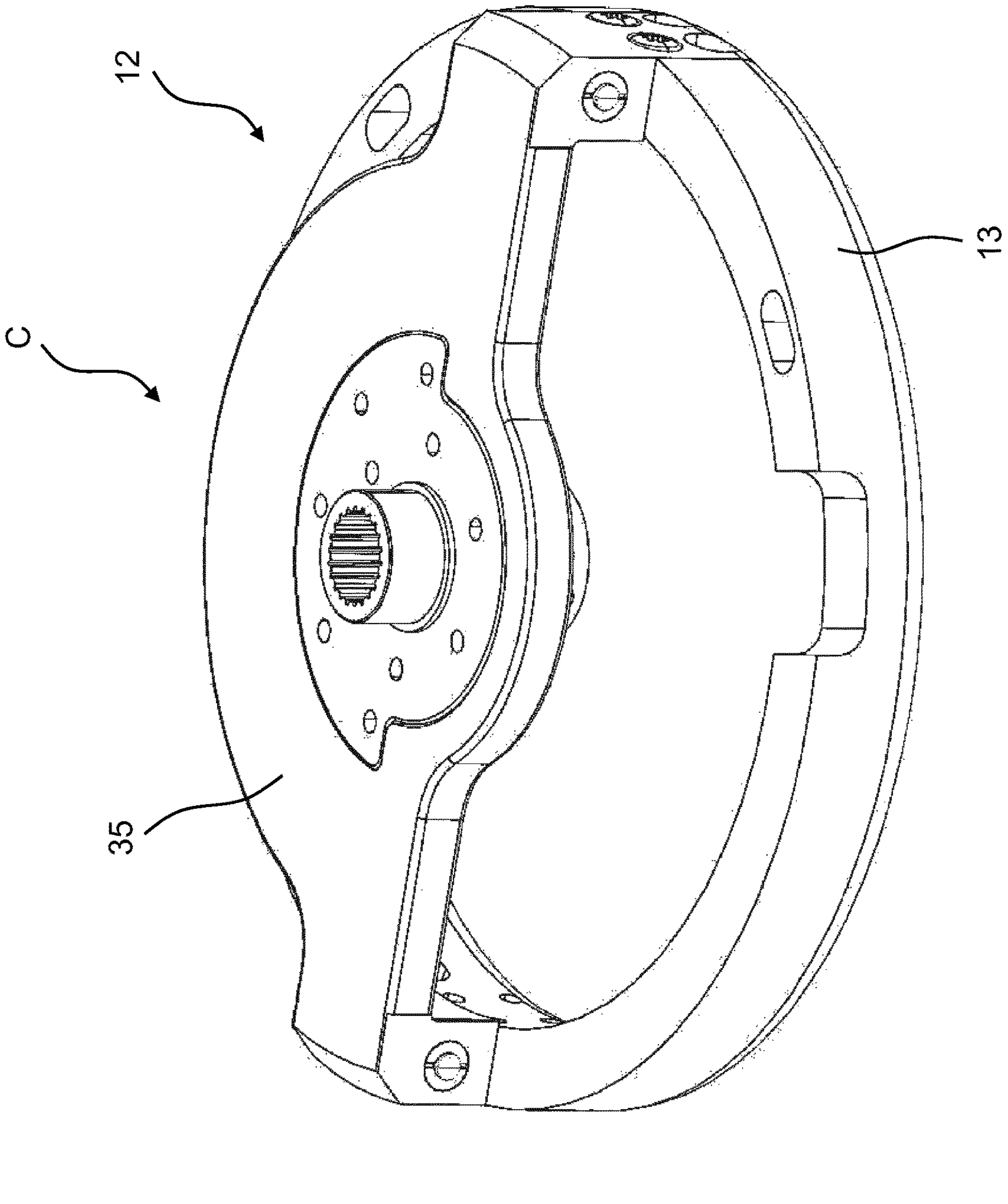
FIG. 6 is a perspective view of a second driving section of the driving system according to FIGS. 2 and 3.

FIG. 6 is a perspective view of the second driving section C, illustrating the flywheel mechanism 12. The flywheel mechanism 12 comprises a buffer element 35, which is connected on two ends with the flywheel 13. As already explained above, the flywheel 13 is constructed as a mainly annular flywheel providing a mainly evenly distributed inertial mass. This leads to a good driving performance for controlled switching of the vacuum interrupter driving mechanism 10 as explained above. Moreover, the annual flywheel 13 has a dielectric function as well. The lower side of the ring 13 is fully rounded. It acts as a shield for better electric field distribution within the OLTC housing.

Figure 7:
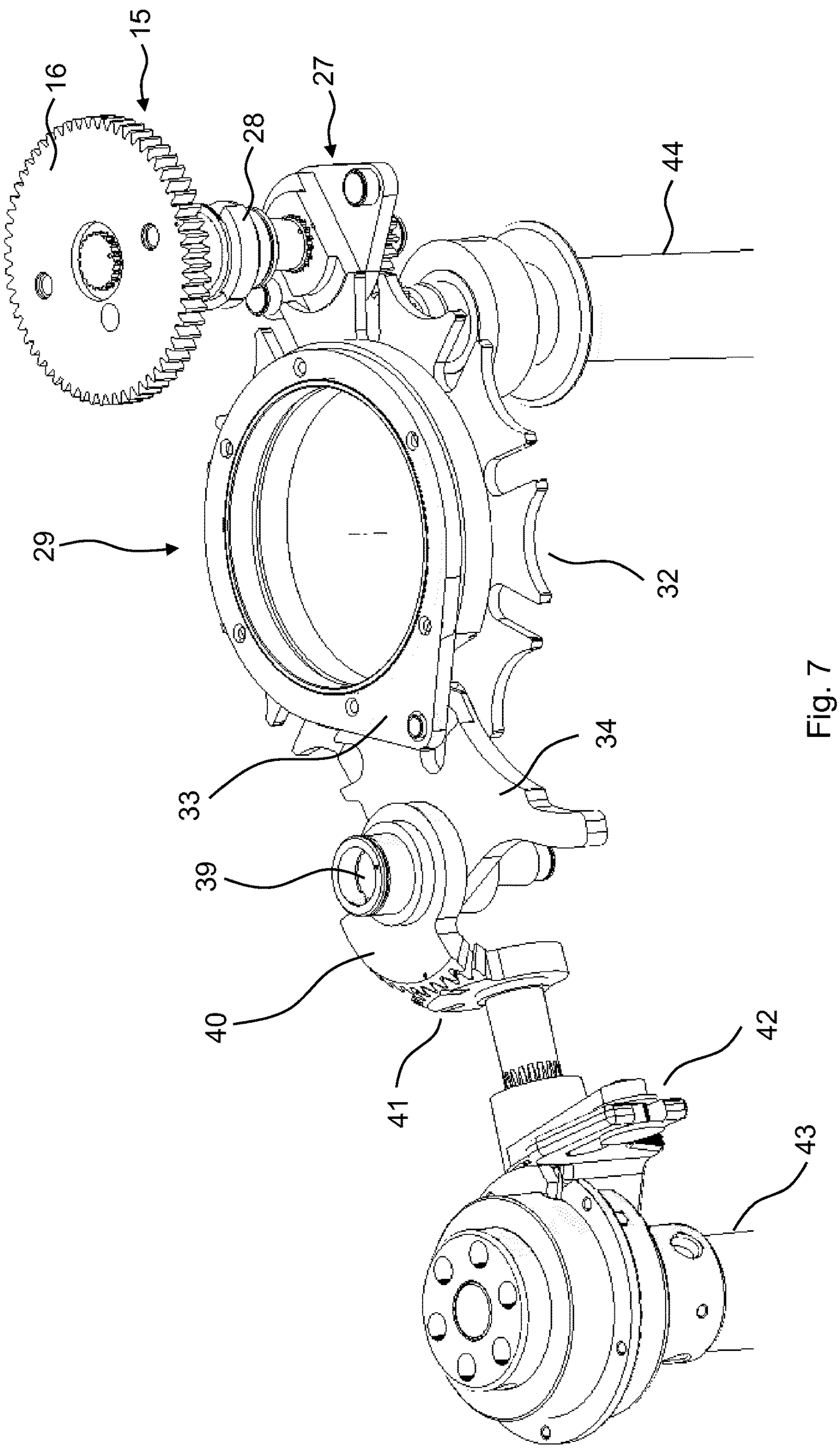
FIG. 7 is a perspective view of parts of the energy accumulation section and first driving section of the driving system according to FIGS. 4 and 5.

FIG. 7 shows a perspective view of parts of the energy accumulation section A and first driving section B of the driving system 1 according to FIGS. 4 and 5.

FIG. 7 illustrates the mechanical coupling between the primary driving unit 15 (on the right side) and the drive shaft 43 of the changeover selector (on the left side).

The gear wheel 16 of the primary driving unit 15 couples with coupling 28 (force-coupling or idle movement as explained above). Due to this, the driving wheel 27 of the selector system driving mechanism 11 is actuated and causes rotary movement of the drive shaft 44 of the selector system (see above explanations). Moreover, the driving wheel 27 of the selector system driving mechanism 11, when actuated, causes rotary movement of the rotary element 29 with Geneva ring 32 and Geneva drive 33 (as explained above). The Geneva drive 33 is coupled with coupling element 34, the latter forming a Geneva sector, such that coupling element 34 is urgent into rotary movement due to rotary movement of the Geneva drive 33.

In this way, the Geneva mechanism 33/34 is configured to transmit rotational movement onto the shaft 39 of the changeover selector driving mechanism 9. In this embodiment, a bevel gear wheel 40 is attached to the shaft 39 of the changeover selector driving mechanism 9. The bevel gear wheel 40 interacts with a second bevel gear wheel 41 and rotates the second bevel gear wheel 41 through rotation of the first bevel gear wheel 40. A lever 42 is coupled to the second bevel gear wheel 41 for transmission of rotation into linear movement along a shaft 43 of the changeover selector for operating the changeover selector.

The driving system 1 provides a good performance regarding the accumulation and synchronous release of energy to perform the required driving, while at the same time not to release too much energy leading to a damage of the components. The driving system 1 supplies the energy, respectively the specific motions, needed for driving the different driving components, i.e. the vacuum interrupter driving mechanism 10 as well as the selector driving mechanism 11 and change-over selector driving mechanism 9, in an un-interrupted and synchronous matter.

While the disclosure is amenable to various modifications and alternative forms, specifics thereof have been shown by way of example in the figures and described in detail. It should be understood, however, that the intention is not to limit the disclosure to the particular embodiments described. On the contrary, the intention is to cover all modifications, equivalents, and alternatives falling within the scope of the disclosure defined by the appended claims.)

The embodiments shown in the FIGS. 1 to 6 as stated represent exemplary embodiments of the improved arrangement and method. Therefore, they do not constitute a complete list of all embodiments according to the improved arrangement and method. Actual arrangements and methods may vary from the embodiments shown in terms of arrangements, components, and devices for example.

REFERENCE SIGNS

1 driving system
2 carrying flange
3 screw connection
4 housing
5 MDU connection
6 loading mechanism
7 spring mechanism
8 position indicator
9 changeover selector driving mechanism
10 vacuum interrupter driving mechanism
11 selector system driving mechanism
12 flywheel mechanism
13 flywheel
14 energy accumulation mechanism
15 primary driving unit
16 gear wheel
17 gear
18 loading rod
19 loading lever
20 upper rolling-contact bearing
21 lower rolling-contact bearing
22 right lever
23 left lever
24 springs
25 rotary wheel
26 coupling
27 driving wheel
28 coupling
29 rotary element
30 protrusion
31 indentation
32 Geneva ring
33 Geneva drive

34 coupling element
35 buffer element
36 holding area
37 gear wheel
38 gear wheel
39 shaft
40 bevel gear wheel
41 bevel gear wheel
42 lever
43 drive shaft of changeover selector
44 drive shaft of selector system
15
A energy accumulation section
B first driving section
C second driving section
L1 main driving axis
L2 secondary driving axis

The invention claimed is:

1. A driving system for an on-load tap changer, comprising:

a vacuum interrupter driving mechanism configured to drive a vacuum interrupter of the on-load tap changer;

an energy accumulation mechanism mechanically coupled with the vacuum interrupter driving mechanism; and a flywheel mechanism mechanically coupled with the vacuum interrupter driving mechanism, wherein the flywheel mechanism comprises a flywheel which is configured as an annular rounded flywheel, such that there is a free space inside the annulus of the annular rounded flywheel when coupled to the vacuum interrupter driving mechanism, wherein the energy accumulation mechanism is mechanically coupled with a primary driving unit and the energy accumulation mechanism is configured to accumulate and release energy for combined motion of the vacuum interrupter driving mechanism and the flywheel mechanism, and wherein the vacuum interrupter driving mechanism and the flywheel mechanism are arranged along a main driving axis and the flywheel is concentrically arranged around the main driving axis.

2. The driving system according to claim 1, wherein the primary driving unit is mechanically coupled with a motor drive unit connection.

3. The driving system according to claim 1, wherein the energy accumulation mechanism comprises a spring mechanism configured to accumulate spring energy and a loading mechanism mechanically coupled with the primary driving unit and with the spring mechanism, wherein the loading mechanism is configured to load the spring mechanism for accumulating spring energy in the spring mechanism such that the accumulated spring energy is releasable from the loaded spring mechanism to drive the vacuum interrupter driving mechanism.

4. The driving system according to claim 1, wherein the vacuum interrupter driving mechanism comprises a rotary wheel arranged around the main driving axis and eccentrically coupled with a coupling element of the energy accumulation mechanism, wherein the coupling element of the energy accumulation mechanism is configured to transmit rotary motion caused by the release of energy from the energy accumulation mechanism into rotary motion of the rotary wheel of the vacuum interrupter driving mechanism.

5. The driving system according to claim 1, further comprising a selector system driving mechanism configured to drive a selector system of the on-load tap changer, wherein the selector system driving mechanism is mechanically coupleable with a drive shaft of the selector system for driving the selector system, and wherein the selector system driving mechanism is mechanically coupleable with the primary driving unit.

6. The driving system according to claim 5, wherein the selector system driving mechanism comprises a coupling configured to transmit rotary movement from the primary driving unit to the selector system driving mechanism in determined rotary states of the primary driving unit and to cause an idle movement of the primary driving unit with respect to the selector system driving mechanism in other rotary states of the primary driving unit.

7. The driving system according to claim 1, further comprising a changeover selector driving mechanism configured to drive a changeover selector of the on-load tap changer, wherein the changeover selector driving mechanism is mechanically coupleable with a drive shaft of the changeover selector for driving the changeover selector, and wherein the changeover selector driving mechanism is mechanically coupled with the primary driving unit.

8. The driving system according to claim 7, wherein the selector system driving mechanism comprises a driving wheel, wherein the driving wheel is mechanically coupleable with the primary driving unit and with a rotary element, such that the rotary element is rotatable by the primary driving unit via the driving wheel, and wherein the changeover selector driving mechanism is mechanically coupled with the rotary element, such that the rotary element is rotatable by the driving wheel of the selector system driving mechanism and the changeover selector driving mechanism is operable by the rotary element.

9. An on-load tap changer, comprising a driving system comprising:

a vacuum interrupter driving mechanism configured to drive a vacuum interrupter of the on-load tap changer;

an energy accumulation mechanism mechanically coupled with the vacuum interrupter driving mechanism; and a flywheel mechanism mechanically coupled with the vacuum interrupter driving mechanism, wherein the flywheel mechanism comprises a flywheel which is configured as an annular rounded flywheel, such that there is a free space inside the annulus of the annular rounded flywheel when coupled to the vacuum interrupter driving mechanism, wherein the energy accumulation mechanism is mechanically coupled with a primary driving unit and the energy accumulation mechanism is configured to accumulate and release energy for combined motion of the vacuum interrupter driving mechanism and the flywheel mechanism, and wherein the vacuum interrupter driving mechanism and the flywheel mechanism are arranged along a main driving axis and the flywheel is concentrically arranged around the main driving axis.

10. The on-load tap changer according to claim 9, comprising a cylindrically formed housing and a carrying flange arranged on the cylindrically formed housing, wherein the driving system is attached to the carrying flange and concentrically placed relative to the cylindrically formed housing.

11. The on-load tap changer according to claim 9, wherein the primary driving unit is mechanically coupled with a motor drive unit connection.

12. The on-load tap changer according to claim 9, wherein the energy accumulation mechanism comprises a spring mechanism configured to accumulate spring energy and a loading mechanism mechanically coupled with the primary driving unit and with the spring mechanism, wherein the loading mechanism is configured to load the spring mechanism for accumulating spring energy in the spring mechanism such that the accumulated spring energy is releasable from the loaded spring mechanism to drive the vacuum interrupter driving mechanism.

13. The on-load tap changer according to claim 9, wherein the vacuum interrupter driving mechanism comprises a rotary wheel arranged around the main driving axis and eccentrically coupled with a coupling element of the energy accumulation mechanism, wherein the coupling element of the energy accumulation mechanism is configured to transmit rotary motion caused by the release of energy from the energy accumulation mechanism into rotary motion of the rotary wheel of the vacuum interrupter driving mechanism.

14. The on-load tap changer according to claim 9, the driving system further comprising a selector system driving mechanism configured to drive a selector system of the on-load tap changer, wherein the selector system driving mechanism is mechanically coupleable with a drive shaft of the selector system for driving the selector system, and wherein the selector system driving mechanism is mechanically coupleable with the primary driving unit.

15. The on-load tap changer according to claim 14, wherein the selector system driving mechanism comprises a coupling configured to transmit rotary movement from the primary driving unit to the selector system driving mechanism in determined rotary states of the primary driving unit and to cause an idle movement of the primary driving unit with respect to the selector system driving mechanism in other rotary states of the primary driving unit.

16. The on-load tap changer according to claim 9, the driving system further comprising a changeover selector driving mechanism configured to drive a changeover selector of the on-load tap changer, wherein the changeover selector driving mechanism is mechanically coupleable with a drive shaft of the changeover selector for driving the changeover selector, and wherein the changeover selector driving mechanism is mechanically coupled with the primary driving unit.

17. The on-load tap changer according to claim 16, wherein the selector system driving mechanism comprises a driving wheel, wherein the driving wheel is mechanically coupleable with the primary driving unit and with a rotary element, such that the rotary element is rotatable by the primary driving unit via the driving wheel, and wherein the changeover selector driving mechanism is mechanically coupled with the rotary element, such that the rotary element is rotatable by the driving wheel of the selector system driving mechanism and the changeover selector driving mechanism is operable by the rotary element.

18. A method of operating a driving system for an on-load tap changer, the method comprising:

mechanically coupling an energy accumulation mechanism of the driving system with a primary driving unit of the driving system to accumulate energy;

mechanically coupling the energy accumulation mechanism with a vacuum interrupter driving mechanism of the driving system;

mechanically coupling the vacuum interrupter driving mechanism with a flywheel mechanism, wherein the flywheel mechanism comprises a flywheel which is configured as an annular rounded flywheel, such that there is a free space inside the annulus of the annular rounded flywheel when coupled to the vacuum interrupter driving mechanism, and wherein the vacuum interrupter driving mechanism and the flywheel mechanism are arranged along a main driving axis and the flywheel is concentrically arranged around the main driving axis;

accumulating energy in the energy accumulation mechanism by loading the energy accumulation mechanism through operation of the primary driving unit; and releasing the accumulated energy from the energy accumulation mechanism for combined motion of the vacuum interrupter driving mechanism and the flywheel mechanism to drive a vacuum interrupter of the on-load tap changer.

19. The method according to claim 18, applied to a driving system according to claim 1 or to an on-load tap changer according to claim 9 or 10.

20. The method according to claim 18, applied to an on-load tap changer according to claim 9.

* * * * *